United States Patent
Strutz et al.

(10) Patent No.: US 6,731,922 B1
(45) Date of Patent: *May 4, 2004

(54) OPTICAL IMAGE REJECT DOWN CONVERTER

(75) Inventors: Shane J. Strutz, Columbia, MD (US); Keith J. Williams, Owings, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 403 days.

This patent is subject to a terminal disclaimer.

(21) Appl. No.: 09/662,839

(22) Filed: Sep. 15, 2000

(51) Int. Cl.$^7$ .................................................. H04B 1/10
(52) U.S. Cl. ....................... 455/302; 455/303; 455/315; 455/317; 359/326; 359/245
(58) Field of Search .................................. 455/302, 303, 455/315, 316, 317, 323, 326; 359/245, 326

(56) References Cited

U.S. PATENT DOCUMENTS 5,826,174 A * 10/1998 Vu
6,476,957 B1 * 11/2002 Ward et al.

OTHER PUBLICATIONS

Johnson et. al.; Serrodyne Optical Frequency Translation with High Sideband Suppression; J. of Lightwave Tech.; vol. 6; p. 109; 1988.
Linsay et al.; Photonic Mixers Forewideband RF Receiver Applications; IEEE Trans. MTT; vol. 43; No. 9; pp. 2311–2317; Sep. 1995.
Gopalakrisnam et al.; A Low Loss Down Converting Fiber Optic Link; vol. 43; No. 9; pp. 2318–2323; Sep. 1995.
Chao et al.; Photonic Mixers and Image–Rejection Mixers for SCM Systems; IEEE Trans. MTT; vol. 45; No. 8; p. 1478; 1997.
Williams et al.; Optically Amplified Down Converting Link with Shot–Noise–Limited Performance; IEEE Trans. MTT; vol. 45; No. 8; pp. 1348–1389; Aug. 1997.
Chao et al.; Photonic Mixers and Image–Rejection Mixers for Optical SCM Systems; IEEE Trans. Microwave Theory And Technique; vol. 45; No. 8; pp. 1478–1480; Aug. 1987.
Biernacki et al.; A Two–Channel Optical Down Converter for Phase Detection; IEEE Trans. Microwave Theory and Techniques; vol. 46; No. 11; pp1784–1787; Nov. 1998.
Cumming; The Serrodyne Frequency Translator; Proc. IEEE; vol. 45; No. 2; pp.—; Feb. 1957.
Ward et al.; An Ultra Wide Band Image Rejecting Microwave Downconverter Using WDM; MWP 199 Digest p. F–96; Date Unknown.

* cited by examiner

Primary Examiner—Nguyen T. Vo
Assistant Examiner—Huy Nguyen
(74) Attorney, Agent, or Firm—John J. Karasek; John Gladstone Mills, III

(57) ABSTRACT

The remotable, ultrawide band optical image rejection downconverter uses sub-carrier modulation techniques without concern for image frequency interferences in the shifted signal, thereby allowing telecommunications systems to downconvert densely multiplexed communications channels into a low frequency band where conventional electronics can perform signal-processing functions. This invention has the image rejection (>120 dB) to provide unambiguous signals for direction finding applications and exhibits an efficient image that permits multi-octave microwave frequency reception and compression. This invention is intrinsically remoteable, and due to the various optical and electrical components proves to be very useful and practical in numerous fiber optic and antenna systems.

9 Claims, 3 Drawing Sheets

OPTICAL IMAGE REJECT DOWN CONVERTER

BACKGROUND OF THE INVENTION

1. Field of the Invention

This invention pertains generally to an optical downconverter and more specifically to an invention for improving the image rejection capability of image rejection downconverters.

2. Description of the Related Art

There are two primary types of image rejection systems that provide significant frequency translation; those which use a digital phase modulator to produce a serrodyne phase modulated waveform and those which split a received signal into two parts and then recombine them in a way which eliminates the unwanted image and carrier frequencies.

Optical image rejection mixers that utilize the serrodyne method of frequency translation apply a phase modulated sawtooth waveform to the optical signal, thereby causing the frequencies to shift. The achievable image rejection is limited by the number of discrete bits that can be implemented by the digital phase modulator when approximating the sawtooth waveform. This limits the image rejection to approximately 25 dB.

In the case of microwave image rejection mixers, the achievable image rejection is limited by the need for near perfect amplitude and phase control. As shown in FIG. 1, a received radio frequency (RF) signal 12 is first divided into, two RF signals 16 and 18 in an in-phase power divider 14 mixed with an electromagnetic signal 22 from a local oscillator, (commonly referred to as LO IN) which is split into two signals 24 and 26 in a first 3 dB 90° hybrid combiner 28. The mixers 32 and 34 mix the pair of signals from the local oscillator 26 and 28 with the pair of input RF signals 16 and 18 to produce a pair of respective RF signals 36 and 38 having a 90° phase shift between the two component signals 36 and 38, which are recombined in a second 3 dB 90° hybrid circuit 42 to produce an output intermediate frequency (IF) 44 for use by other electronic components (not shown). Exact amplitude and phase matching with broad band signals is nearly impossible with strictly microwave components since the frequency response of each of the components varies. A typical device, with a 3° phase error and a 0.25 dB amplitude imbalance upon recombination, is limited to about 30 dB of image and carrier rejection. Further details on serrodyne frequency shifting is found in Johnson et al., SERRODYNE OPTICAL FREQUENCY TRANSLATION WITH HIGH SIDEBAND SUPPRESSION, J. of Lightwave Tech.; Vol. 6, pg. 109, 1988.

An optical image rejection downconverter with >60 dB of image rejection is a recently developed device that utilizes an electronic mixer to upconvert signals into the passband of a bandpass filter followed by optical downconversion of the filtered signals into the desired output band. This system developed by Ward et al. for which patent protection is being sought in the Navy Case No. 79,800, U.S. Patent Application Serial Number (not yet assigned) filed on Jul. 17, 2000, entitled IMAGE REJECTING MICROWAVE PHOTONIC DOWNCONVERTER is an improvement over the previous presented optical and electronic mixers. The system exhibits more than 60 dB of image rejection; however, it is limited by the production of unwanted harmonics by the upconverting mixer. The key to eliminating the spurious signals is to change which sideband is filtered. In Ward et al. the system is designed to operate with the local oscillator (LO1) at a frequency below the passband of the band pass filter (BPF), causing the negative (lower sideband) frequencies of the received RF signal to be shifted into the bandpass of the BPF. With this technique, unwanted frequencies are converted into the passband of the bandpass filter and as a result appear at the output of the system. These unwanted frequencies produce spurious signals in the system output which are only 25 dB below the desired signal power, severely limiting the sensitivity of the system.

SUMMARY OF THE INVENTION

A object of the invention is a device to increase the amount of image rejection while decreasing the power in harmonic spurious radiations to approximately 60 dB below the desired signal power in an image rejection device.

Another object of this invention is to provide a device for upconverting broadband electrical signals, filtering out image frequencies in the electrical domain and then downconverting the desired frequency using optical techniques.

Another object of this invention is to obtain a frequency shifted microwave signal utilizing electro-optic modulators and bandpass electronic filters.

Another object of this invention is to provide an analog device that does not rely upon phase or amplitude matching to achieve image rejection.

These and other objects are accomplished by a remotable, ultrawide band optical image rejection downconverter using sub-carrier modulation techniques without concern for image frequency interferences in the shifted signal, thereby allowing telecommunications systems to downconvert densely multiplexed communications channels into a low frequency band where conventional electronics can perform signal-processing functions. Further, this invention has the image rejection (>120 dB) to provide unambiguous signals for direction finding applications and exhibits an efficient image that permits multi-octave microwave frequency reception and compression. This invention is intrinsically remoteable, and due to the various optical and electrical components proves to be very useful and practical in numerous fiber optic and antenna systems.

DESCRIPTION OF THE PREFERRED EMBODIMENT

Figure 1:
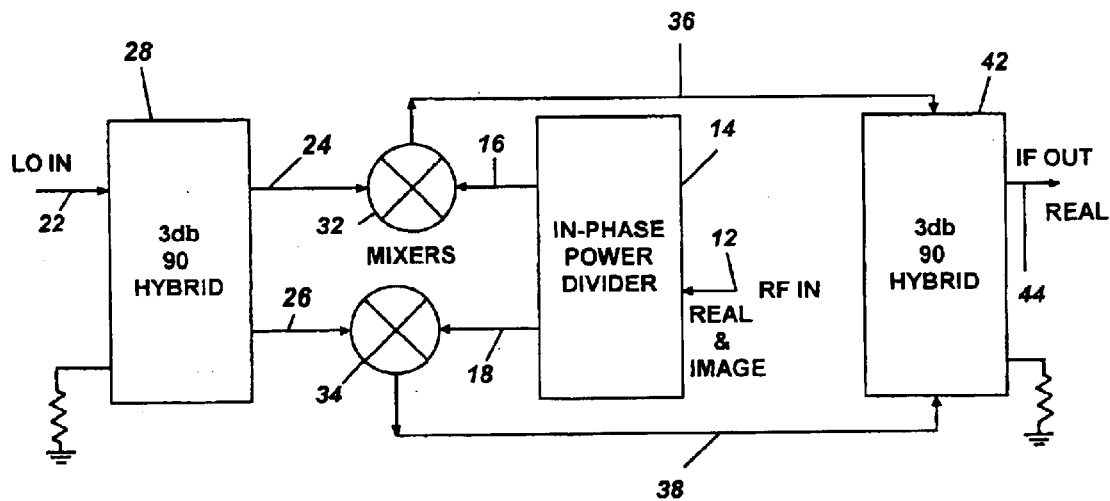
FIG. 1 shows a microwave image rejection mixer of the prior art.
Figure 2A:
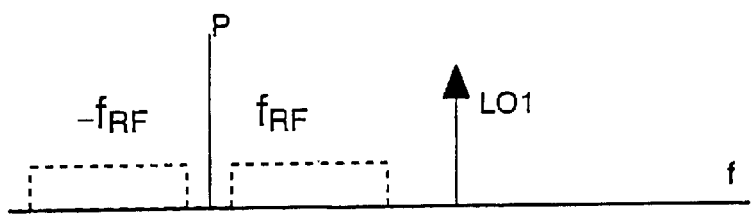
FIG. 2a shows a mixing that occurs between the radio frequency signal and the injected signal from the first local oscillator (LO1).
Figure 2B:
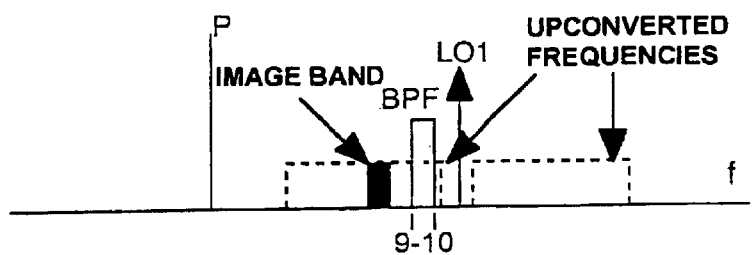
FIG. 2b shows a superposition of the resulting mixer IF output.
Figure 2C:
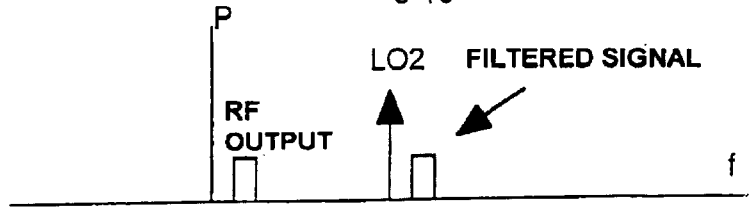
FIG. 2c shows a filtered output of the upconverted RF upon leaving the bandpass filter downconverted to the desired IF frequency range using a fixed second local oscillator (LO2) carrier.

This invention is a remotable, ultrawide band optical image rejection downconverter image rejection to greater than 120 dB, and rejection of harmonic spurious conditions to more than 60 dB below the desired signal power. The general operational principles of the invention are shown in FIGS. 2a, 2b and 2c. FIGS. 2a, 2b and 2c depict a graphical representation of the traditional and image rejecting downconverter input signals. FIG. 2a shows the mixing that occurs between the radio frequency signal and the injected signal from the first local oscillator (LO1). FIG. 2b shows the superposition of the resulting mixer IF output. FIG. 2c shows the filtered output of the upconverted RF upon leaving the bandpass filter downconverted to the desired IF frequency range using a fixed second local oscillator (LO2) carrier.

In this embodiment, any spurious signal problem is alleviated by choosing LO1 frequencies above the passband of the BPF, causing the positive frequencies (upper sideband) to be shifted into the passband of the BPF. Using high frequency LO1 values removes the problem of harmonic upconversion of LO1, and the conversion of spurious signals. The increased image rejection of this embodiment is a distinct advantage over the typical serrodyne and electronic mixers; and the reduction in the spurious signal power is a distinct advantage over the systems of the prior art.

The remotable, ultrawide band image rejection mixer maps signals into an arbitrary intermediate frequency band, thereby allowing telecommunications systems to downconvert densely multiplexed ultrawide bandwidth channels into low frequency bands where conventional electronics can perform signal-processing functions. Further, this invention has the image rejection (>120 dB) to provide unambiguous signals for direction finding applications and exhibits an efficient image that permits multi-octave microwave frequency reception and compression. In addition, this invention is intrinsically remoteable, and due to the various optical and electrical components proves to be very useful and practical in numerous fiber optic and antenna systems.

Referring to FIG. 2a, radio frequency (RF) signals, $f_{RF}$, received by the system are first upconverted with a first local oscillator (LO1) ($f_{UP}=f_{LO1}-f_{RF}$). As a result, a portion of the positive frequency components (upper sideband) is shifted into the passband of a bandpass filter (BPF), FIG. 2b. The BPF attenuates the unwanted upper sideband frequencies, the image band, and original signals, leaving only the desired shifted frequencies. Next the output of the BPF is mixed with a second local oscillator (LO2) to downconvert the filtered signals into a desired output band, representing an intermediate frequency (IF) usable by conventional electronics. Unlike the cited prior art, the LO1 in this invention is at a higher frequency than the passband of the BPF and operates by shifting the positive frequency components into the passband. This eliminates the conversion of unwanted signals into the passband of the BPF and the subsequent production of spurious signals within the output of the system, as shown in FIG. 2c. This system provides a significant improvement over image rejection downconverters of the prior art.

Figure 3:
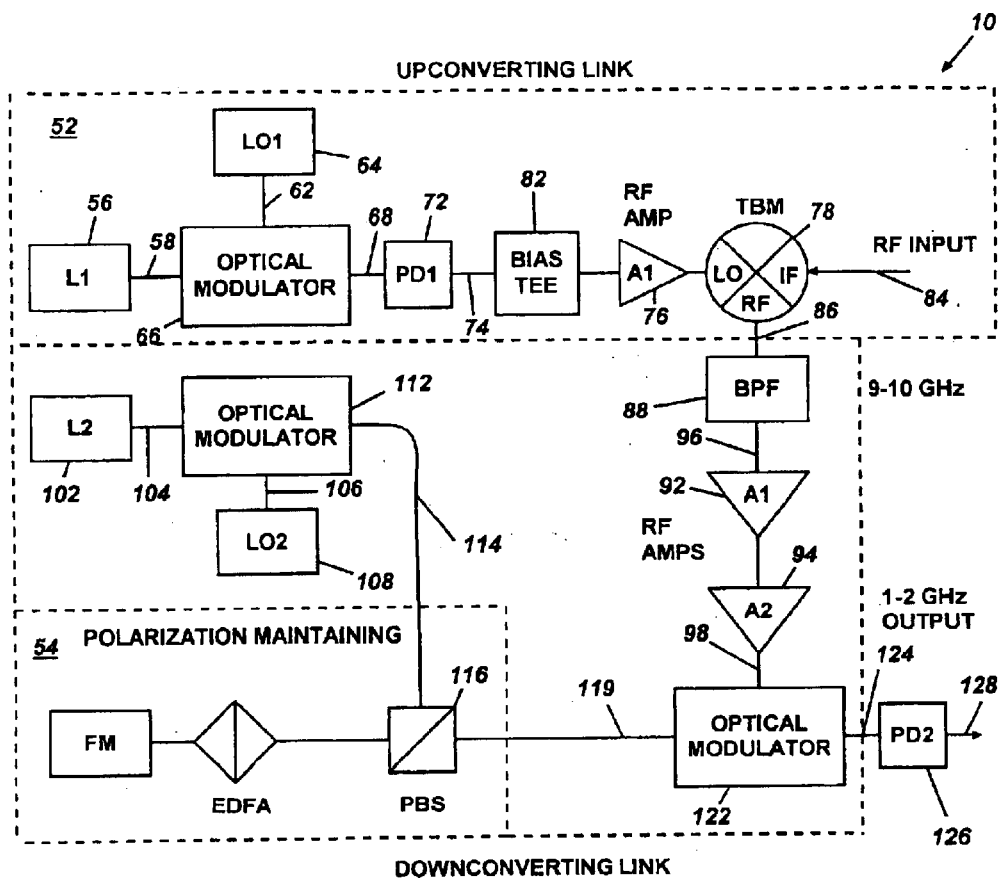
FIG. 3 shows a schematic of an optical image rejection downconverter

The optical image rejection downconverter 10, as shown in FIG. 3, consists of an upconverting and a downconverting photonic RF/link, 52 and 54, respectively. The upconverting link 52 is further comprised of a first laser light source 56, providing an optical carrier 58 at a wavelength $\lambda_1$, which is modulated by a sinusoidal electrical signal 62 generated by a first local oscillator (LO1) 64, in a first optical modulator 66, such as a Mach-Zehnder optical modulator or similar device, to produce a first modulated optical carrier 68 which is applied to a first high speed photodetector (PD1) 72, where the optical carrier 68 is converted to an electrical signal 74 by a photodetector which is biased in the bias tee 82. The electrical signal is amplified by a first amplifier (A1) 76 and drives an upconverting mixer 78.

The electronic mixer 78, the amplified electrical signal 82 is mixed with an analog ulta-broadband radio frequency (RF) signal 84 from a remote antenna receive array (not shown) to produce an upshifted frequency band signal 86. The mixer 78 acts to shift the entire RF band to a higher frequency band equal to the original RF frequency plus the frequency of the LO1 64.

The optical fiber conducting the optical carrier 58 from the first laser polarization maintaining fiber and the optical fiber conducting the modulated optical carrier 68 from the first optical modulator 66 to the first photodetector (PD1) 72 may be of any type.

The downconverting link 54 is comprised of a second optical light source (L2) 102, centered at a wavelength, $\lambda_2$, which provides a second optical carrier 104 which is modulated by a sinusoidal electrical signal 106, generated by a second local oscillator (LO2) 108, in a second optical modulator 112, which is preferably a Mach-Zehnder optical modulator, however any suitable optical modulator well known to those skilled in the art may be used, to produce a second electro-optically modulated carrier 114. The second electro-optically modulated carrier 114 is passed through a beam splitter 116 where it is passed through a double-pass erbium doped fiber amplifier (EDFA) 118 and reflected in a Farraday Mirror 116 and again passed through the beam splitter 116 and applied to a third optical modulator 122 producing a delayed second electro-optically modulated carrier 119.

In the downconverting link 54, the up-shifted frequency band signal 86 is applied to an electronic band pass filter (BPF) 88, preferably having a bandpass of 9–10 GHz with −80 dB attenuation, which attenuates all unwanted frequencies, including the original RF band and other converted terms, frequencies outside the up-converted passband, before amplification by a plurality of electronic amplifiers 92 and 94 (however, one amplifier may be sufficient) to produce an amplified filtered upshifted frequency band electrical signal 98. The amplified filtered upshifted frequency band signal 98 is applied to the third optical modulator 122 to modulate the delayed second electro-optically modulated carrier 119, producing a downconverted optical signal 124 of 1–2 GHz. The downconverted optical signal passes through an optical fiber to a second photodetector (PD2) 126 producing an intermediate frequency electrical signal 128 transmitted to the electrical outport of the system for application to user electronics.

Figure 4:
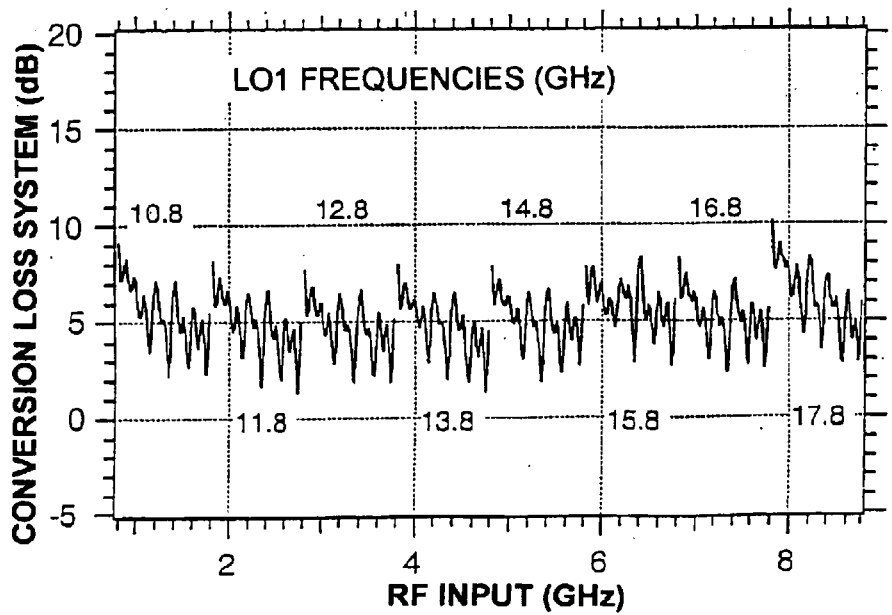
FIG. 4 shows a plot of the conversion loss of an optical image rejection downconverter.

The information shown in FIG. 4 is the conversion loss of the system plotted for LO1 64 frequencies of 10.8, 11.8, 12.8, 13.8, 14.8, 15.8, 16.8, and 17.8 GHz and an LO2 108 frequency of 8 GHz. The conversion loss is between 3 and 10 dB across the 0.8–8.8 GHz RF receive band of the system.

The optical light sources (lasers) L1 and L2 56 and 102, respectively, are of relatively low relative intensity noise level and, preferably, are shot noise limited. A semiconductor distributed-feedback (DFB) laser has been found to be adequate for the system, however, any laser meeting the requirements may be used. Also, a single mode laser is preferred, however, a multimode laser may be utilized. The only restriction is that the laser be a low noise laser.

Optical fibers connecting the first optical modulator 68 with the first photodetector (PD1) 72 and the second optical modulator 112, and third optical modulator 122 to the second photodetector (PD2) 126 are single mode fibers. The optical fiber between the lasers L1 and L2, 56 and 116, respectively, and the optical modulators 66 and 104 is a polarization preserving fiber because the optical modulators 66, 106 and 122 are polarization sensitive. Though it is realized that the advent of polarization insensitive modulators would allow the use of single or multimode fiber.

The first and second modulated optical carries 68 and 114, respectively, may be transmitted independently by two polarization-maintaining (PM) optical fibers of arbitrary length because the local oscillators 64 and 108 are at different frequencies. In the case of thermal fluctuations, or other irregularities, the phase does not have to be kept constant between the outputs 68 and 114 of the modulators 66 and 112 because of the lack of any phase relationship between the local oscillators LO1 and LO2 64 and 108, respectively.

LO1 64 and LO2 112 have low phase noise characteristics. In this application, any local oscillator of decent quality may be used, such as a cavity oscillator. However, it is noted that LO1 64 is tunable and acts to translate a desired portion of the received RF frequency band through the bandpass filter 88. LO2 112 need not be tunable. The purpose of LO1 64 being tunable is that it shifts the RF input frequency 62 into the pass band of the bandpass filter 88. The LO1 64 frequency is determined by the RF input signal 62 frequency range, DC to 18 GHz, at the input, and on the frequency range of the bandpass filter 88. In order to avoid overlap between the original RF input band 62 and the filtered passband signal 96 at the output of the electronic mixer 78 (similar to the unisolated RF indicated in FIG. 2b), the filter 88 is chosen so that the lower limit of the filter passband is a few GHZ higher than the maximum RF input 84 frequency. In addition, LO isolation becomes a concern as the minimum RF input 78 frequency approaches DC because the LO frequency required to upconvert will approach the lower limit of the filter passband. As the RF input 84 of interest increases from low frequencies to high frequencies, the frequency of LO1 64 is decreased from its maximum by the same amount so that the corresponding upconvert frequency 86 lies within the filter 88 passband. The frequency of LO2 112 is constant because the desired portion of the upconverted mixer output 86 is always within the fixed filter 88 passband.

LO1 64, as previously stated, is tunable and acts to translate, in the frequency domain, a desired portion of the received Rf frequency 84 band through the bandpass filter 88. In this way, different regions of the RF band 84 can be transmitted through the filter 88 and downconverted to the intermediate frequency (IF) band 128. Because of the excellent RF to IF isolation of the system 10 due to a 50 to 80 dB filter 88 rejection, the IF band 128 is less than the LO2 112 frequency. The width of the IF band 128 is determined by the width of the bandpass filter 88, Image and fundamental carrier rejection is achieved because those frequency bands are attenuated by the bandpass filter 88, and therefore are not downconverted to the IF band 128.

The only specific requirement for the photodetectors PD1 and PD2 72 and 126, respectively, is that they have enough bandwidth to cover the IF frequency range of the device.

The mixer 78 is a triple balance mixer so as to provide ultra-wideband capability; it must have a large bandwidth signal capability at the input and convert the RF signal 84 to a broadband signal 86 at the output so as to provide a useable signal that is easily processed by the present day electronics as long as it covers the input frequency range desired. This requirement is well known to those skilled in the art. Therefore, if only a few GHz are desired to be studied, then a double-balanced or a single-balanced mixer may be used.

The amplifiers A1 and A2 92 and 94, respectively, are typically narrowband amplifiers. A1 ans A2 92 and 94, respectively, have to be as wide as the filter 88 bandpass. A single amplifier may be substituted foe A1 and A2, 92 and 94 respectively.

Typically, the bandpass filter 88 is a cavity filter with good rejection through the RF frequency 84 range, low loss within the bandpass frequency range and an attenuation of from 60 to 80 dB. Therefore, a typical cavity filter with a DC to 18 GHz range is suitable for the bandpass filter 88.

It will be noticed that any image signals that would be present in the output would be the result of downconversion between LO2 108 at 8 GHz and input RF frequencies that are converted (with LO1 64) into the 6–7 GHz band by the upconverting link. However, the 6–7 GHz signals are attenuated by the BPF 88, and as a result, the system 10 exhibits excellent image rejection. The system described herein is ideal for remote application, since both the LO's 64 and 108 and the output 124 may be remoted.

Figure 5:
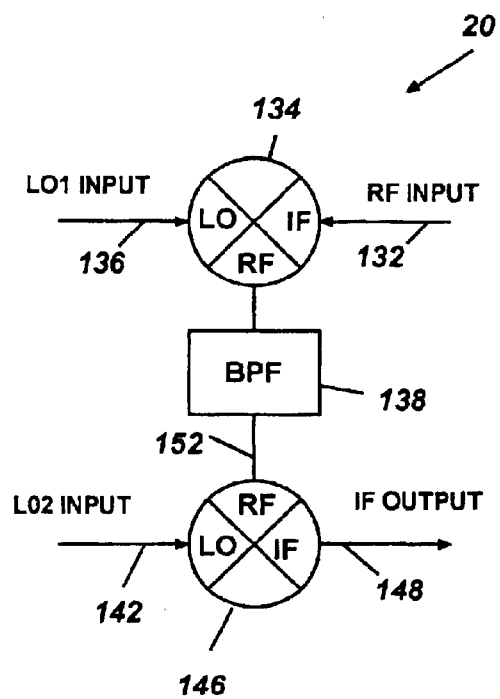
FIG. 5 shows an all-microwave image rejection downconverter.

In another preferred embodiment, a microwave only image rejection downconverter 20, as shown in FIG. 5, an RF signal 132 received by the system 20 is mixed with the signal from a first local oscillator (LO1) 136 in a first mixer 134 to produce frequencies at $f_{RF} \pm f_{LO1}$. As a result the positive frequency components (upper sideband) of the received signal 132 are shifted into the passband of the bandpass filter (BPF) 138. The BPF 138 attenuates the unwanted upper sideband frequencies, the image band, and the original signals, leaving only the desired shifted frequencies 152. These shifted frequencies 152 are then downconverted in a second mixer 146 to produce frequencies in the desired output band 148 ($f_{IF}=f_{BPF}-f_{LO2}$).

Figure 6:
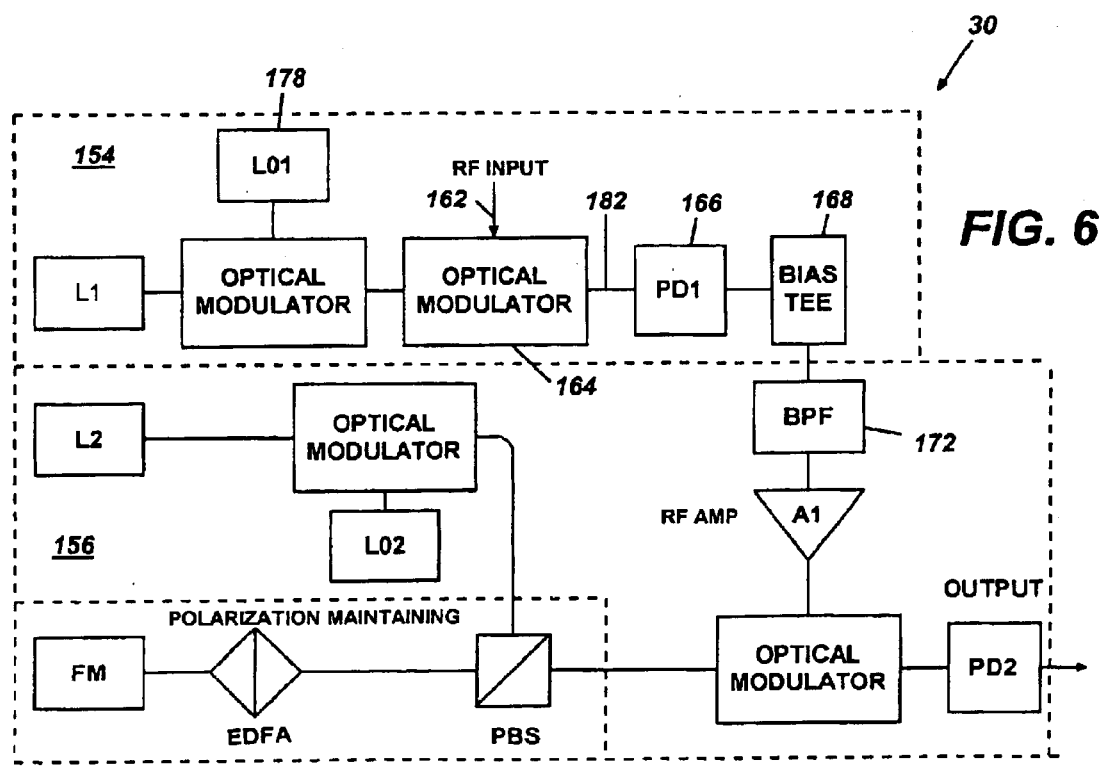
FIG. 6 shows a wideband image rejection downconverter with an optical upconverting link.

In a third preferred embodiment 30, as shown in FIG. 6, the upconverting link 52, shown in FIG. 3, is replaced with an all optical upconverting link 154. The downconversion link 54 of FIG. 3 remains essentially the same. The upconverting optical link 154 may utilize any type of scheme for mixing the RF and LO1 162 and 178, respectively. It may be done either with two series optical modulators 164 and 174, as shown in FIG. 6, or utilizing a single mixing modulator (not shown). After conversion of the mixed optical signal 182, the signal 182 is converted into an electrical signal in a first biased 168 photodetector 166 and applied directly to a bandpass filter 172. The remainder of the circuit is as described above for the first preferred embodiment 20.

The invention described herein provides image rejection of greater than 60 dB across more than 12 GHz, exceeding commercial devices by 25 to 45 dB. By virtue of low-loss optical fibers, this invention allows the lasers and local oscillators to be separated by several kilometers from the remainder of the system. Thus this system may be implemented using a remote antenna site which is advantageous in many situations.

This invention allows the IF band to exist within the RF band, without interference, by using a two-step frequency shift technique and bandpass electronic filters. This differs from the traditional downconverting systems, where the IF bandwidth is limited to the region outside the RF band due to RF-to-IF isolation considerations. For a). 1–18 GHz system, and this would allow for only a DC—100 MHz downconverted IF band. SEE, Linsay et al., PHOTONIC MIXERS FOR WIDEBAND RF RECEIVER APPLICATIONS, IEEE Trans. MTT; Vol. 43, No.9. pp.2311–2317, September 1995; and Gopalakrisnam et al., A LOW LOSS DOWN CONVERTING FIBER OPTIC LINK, Vol. 43, No. 9, pp.2318–2323, September 1995.

With the microwave-photonic image rejecting downconverter, as shown in FIG. 5, it is also possible to implement microwave sub-carrier modulation techniques without concern for image frequency interference in the shifted signal. SEE, Chao et al., PHOTONIC MIXERS AND IMAGE-REJECTION MIXERS FOR SCM SYSTEMS, IEEE Trans. MTT, Vol. 45, No. 8, pg. 1478, 1997. This allows telecommunications and CATV systems to downconvert densely multiplexed communications channels into a low frequency band where conventional electronics can perform signal-processing functions.

Another feature is highlighted by considering the photonic link noise figure (NF). Assuming a 50-ohm, shot noise limited system, the relationship between NF, photodetector current, and modulator half-wave voltage, $V_\pi$, is as described in Williams et al., OPTICALLY AMPLIFIED DOWNCONVERTING LINK WITH SHOT-NOISE-LIMITED PERFORMANCE, IEEE Photonics Tech. Lttrs., Vol. 8, No. 1; pp. 148–150; January 96. From this analysis a typical photodetector current and $V_\pi$ of 10 mA and 10 V, respectively, combinedwith a 7 dB conversion loss yields a noise figure well above a desired maximum NF of 15 dB. Therefore barring any advances in modulator $V_\pi$, phase matched preamplifiers are necessary at an antenna to sufficiently decrease the noise figure of the system.

Since the invention mixes RF signals to a relatively narrow passband, the phase matching requirements normally encountered are eliminated for coherent or incoherent applications. This invention makes phased matched direction finding arrays much more practical due to the reduced sensitivity requirements of the modulators 66, 112 and 122. In traditional phase sensitivity direction finding (DF) arrays which use optical modulators at the antenna site, the use of phase and amplitude matched preamplifiers over the entire RF bandwidth is necessary to achieve low noise figures. This invention relaxes those requirements since phase and amplitude matched amplifiers are only required over the desired filter passband, which in turn, is only as wide as the desired IF processing bandwidth. This is subtle, but very important advantage of this invention.

Referring again to FIG. 3, an electro-optic modulator (e.g., Mach-Zehnder modulator) can perform the mixing function of the conventional microwave mixer 78. Also, the two modulated optical carriers 68 and 114 may be combined onto a single PM optical fiber (assuming the optical carriers are of different wavelengths) using wavelength division-multiplexing (WDM) techniques well known to those skilled in the art. The two modulated optical carriers 68 and 114 are subsequently demultiplexed at the remote site onto separate PM optical fibers using the well known WDM techniques.

By virtue of the low-loss optical fibers, this invention allows the lasers and local oscillators to be separated by as much as 10 km, or more, from the remainder of the system. Thus, this system may be implemented using a more remote antenna site, which is advantageous to many commercial communication and radar applications.

Further, this invention maintains a known phase relationship between the local oscillators 64 and 108 and the received RF signal 84. This allows the image rejection system to be used as a direction finding system.

Although this invention has been described in relation to an exemplary embodiment thereof, it will be understood by those skilled in the art that still other variations and modifications can be affected in the preferred embodiment without detracting from the scope and spirit of the invention as described in the claims.

What is claimed:

1. A device for mapping radio frequency signals into an arbitrary intermediate frequency band comprising:
    means upconverting the radio frequency signals with a signal from a first oscillator at a predetermined frequency;
    means for shifting a portion of the upconverted signal positive frequency components (upper sideband) into a passband of a bandpass filter;
    means for attenuating an unwanted upper sideband frequencies, an image band, and the original radio frequency signals leaving only a desired shifted frequency; and
    means for downconverting the desired shifted frequency by mixing it with a signal from a second oscillator into a desired output frequency band.

2. A device, as in claim 1, wherein the means upconverting the radio frequency signals with a signal from a first oscillator at a predetermined frequency and means for shifting a portion of the upconverted signal positive frequency components (upper sideband) into a passband of a bandpass filter is comprised of:
    a first light source producing a first optical carrier at tunable predetermined wavelength which is modulated by a sinusoidal electrical signal generated by a first local oscillator in an optical modulator to produce a first electro-optical carrier which is converted into a first electrical signal for application to an upconverting mixer; and
    in said mixer a received radio frequency signal is mixed with the first electrical signal to produce an up shifted frequency band signal.

3. A device as in claim 1, wherein, the means for attenuating an unwanted upper sideband frequencies, an image band, and the original radio frequency signals leaving only a desired shifted frequency and means for downconverting the desired shifted frequency by mixing it with a signal from a second oscillator into a desired output frequency band is comprised of
    a second light source providing an optical carrier fixed predetermined wavelength, which is modulated by a sinusoidal electrical signal generated by a second local oscillator in an optical modulator to produce a second electro-optical carrier;
    a fiber link to connect the output of the second modulator to a third optical modulator;
    a filter for filtering said upshifted frequency band signal to eliminate an unwanted upper sideband frequency, an image band and the original signals; said filtered signal is amplified in an amplifier and applied to the third optical modulator;
    within said third optical modulator the second optical carrier is downconverted by the filtered electrical signal into an output optical signal within a desired output band; and
    said output optical signal is converted into an electrical signal for application to user electronic circuits.

4. A remotable, ultrawideband optical image rejection downconverter comprising:

an upconverting photonic/radio frequency (RF) link;

a downconverting photonic/RF link;

said upconverting photonic/RF link further comprising;

a first light source producing a first optical carrier at tunable predetermined wavelength which is modulated by a sinusoidal electrical signal generated by a first local oscillator in an optical modulator to produce a first electro-optical carrier which is converted into a first electrical signal for application to an upconverting mixer;

in said mixer a received radio frequency signal is mixed with the first electrical signal to produce an up shifted frequency band signal; said downconverting link further comprising:

a second light source providing an optical carrier fixed predetermined wavelength, which is modulated by a sinusoidal electrical signal generated by a second local oscillator in an optical modulator to produce a second electro-optical carrier;

a filter for filtering said upshifted frequency band signal to eliminate an unwanted upper sideband frequency, an image band and the original signals; said filtered signal is amplified in an amplifier and applied to the third optical modulator;

within said third optical modulator the second optical carrier is downconverted by the filtered electrical signal into an output optical signal within a desired output band; and said output optical signal is converted into an electrical signal for application to user electronic circuits.

5. A device, as in claim 1, wherein the means upconverting the radio frequency signals with a signal from a first oscillator at a predetermined frequency and means for shifting a portion of the upconverted signal positive frequency components (upper sideband) into a passband of a bandpass filter is comprised of:

a first light source producing a first optical carrier at tunable predetermined wavelength which is modulated by a sinusoidal electrical signal generated by a first local oscillator in a first optical modulator to produce a first electro-optical carrier which is converted into a first electrical signal for application to a second optical modulator, a received radio frequency signal is mixed with the first electrical signal to produce an up shifted frequency band signal.

6. A device as in claim 1, wherein, the means for attenuating an unwanted upper sideband frequencies, an image band, and the original radio frequency signals leaving only a desired shifted frequency and means for downconverting the desired shifted frequency by mixing it with a signal from a second oscillator into a desired output frequency band is comprised of a second light source providing an optical carrier fixed predetermined wavelength, which is modulated by a sinusoidal electrical signal generated by a second local oscillator in a second optical modulator to produce a second electro-optical carrier;

a filter for filtering said upshifted frequency band signal to eliminate an unwanted upper sideband frequency, an image band and the original signals; said filtered signal is amplified in an amplifier and applied to a third optical modulator;

within said third optical modulator the second optical carrier is downconverted by the filtered electrical signal into an output optical signal within a desired output band; and said output optical signal is converted into an electrical signal for application to user electronic circuits.

7. A device for mapping radio frequency signals into an arbitrary intermediate frequency band comprising:

means for mixing a radio frequency from a local oscillator with a receiver radio frequency signal so that the positive frequency components (upper sideband) of the receive signal are shifted into a passband of a bandpass filter;

the bandpass filter for attenuating the unwanted upper sideband frequencies, an image band, and the original radio frequency signals, leaving only a desired shifted frequency; and means for downconverting the desired shifted frequency to produce an output frequency in a desired output frequency band.

8. A device, as in claim 7, wherein the means for mixing a radio frequency from a local oscillator with a receiver radio frequency signal so that the positive frequency components (upper sideband) of the receive signal are shifted into a passband of a bandpass filter and means for downconverting the desired shifted frequency to produce an output frequency in a desired output frequency band is an electronic mixer.

9. A method for mapping radio frequency signals into an arbitrary intermediate frequency band comprising the steps of:

upconverting the radio frequency signals with a signal from a first oscillator at a predetermined frequency;

shifting a portion of the upconverted signal positive frequency components (upper sideband) into a passband of a bandpass filter;

attenuating in the bandpass filter unwanted upper sideband frequencies, an image band, and the original radio frequency signals leaving only a desired shifted frequency; and downconverting the desired shifted frequency by mixing it with a signal from a second oscillator into a desired output frequency band.

\* \* \* \* \*